E. BIEBER & W. L. BURNER.
LOCKING DEVICE FOR DUMP CARS.
APPLICATION FILED MAR. 13, 1908.

907,218.

Patented Dec. 22, 1908.
3 SHEETS—SHEET 1.

WITNESSES:
R. Meiklejohn.
R. Rogers.

INVENTORS.
Emil Bieber
William L. Burner

BY
Geo. W. Rightmire
ATTORNEY.

E. BIEBER & W. L. BURNER.
LOCKING DEVICE FOR DUMP CARS.
APPLICATION FILED MAR. 13, 1908.

907,218.

Patented Dec. 22, 1908.
3 SHEETS—SHEET 3.

WITNESSES:

Emil Bieber
William L. Burner   INVENTORS

BY
ATTORNEY.

UNITED STATES PATENT OFFICE.

EMIL BIEBER AND WILLIAM L. BURNER, OF COLUMBUS, OHIO, ASSIGNORS TO THE KILBOURNE AND JACOBS MANUFACTURING COMPANY, OF COLUMBUS, OHIO, A CORPORATION OF OHIO.

LOCKING DEVICE FOR DUMP-CARS.

No. 907,218.   Specification of Letters Patent.   Patented Dec. 22, 1908.

Application filed March 13, 1908. Serial No. 420,923.

*To all whom it may concern:*

Be it known that we, EMIL BIEBER and WILLIAM L. BURNER, citizens of the United States, residing at Columbus, in the county of Franklin and State of Ohio, have invented certain new and useful Improvements in Locking Devices for Dump-Cars, of which the following is a specification.

Our invention relates to improvements in means for locking dump cars, and contemplates the mounting of the lock upon the underframe construction of the car, preferably one lock on each side thereof adjacent the end of the underframe construction; the construction of the lock renders it possible, upon releasing the lock upon one side of the car, to tilt the car towards the opposite side without manipulating the lock on that side before the dumping takes place; when the car is returned to its normal position, the locking means on the side towards which the car was dumped come into play to prevent the car from passing the horizontal line of its normal position, while the lock on the opposite side of the car which was released again assumes the locking position.

Our invention further contemplates a car lock constructed so as to be operated by the devices which tilt the car, so that the operation of said devices will release the lock desired, and at the same time said devices will cause the car to be dumped; when the car is righted the locking means are thereby restored to their normal condition and will retain the car in its normal position until a subsequent dumping operation is begun.

It further contemplates the provision of similar locking means arranged on each side of the car, and the release of one of said means permits the dumping of the car on the opposite side.

It further contemplates the provision of means for connecting said lock with the dumping devices, for the manipulation of said lock.

It further contemplates the provision of parts and their combinations hereinafter described more fully and included in the claims.

Figure 1:
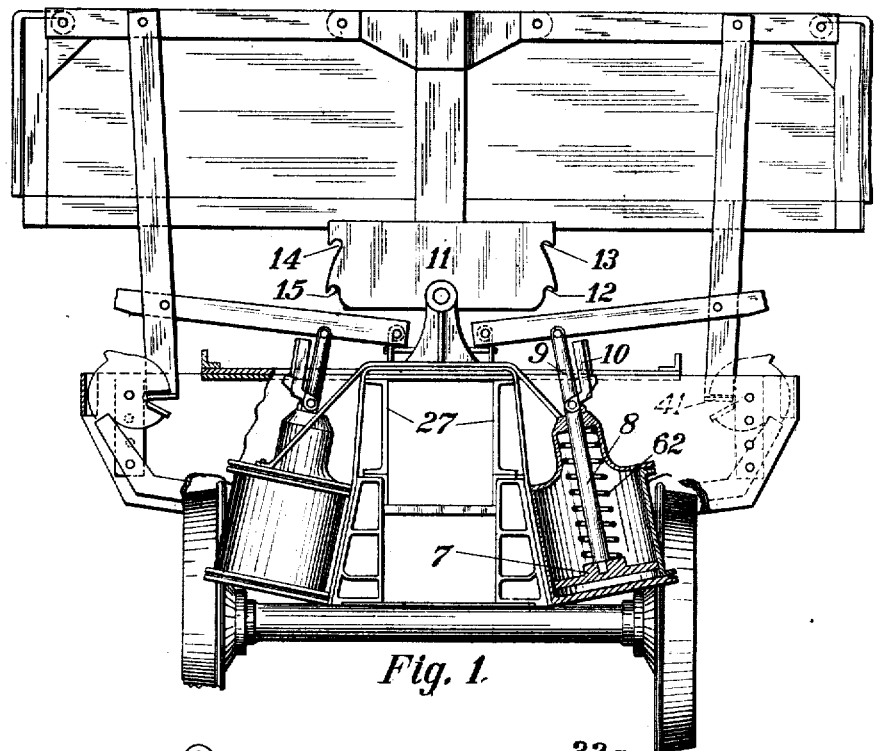
Figure 3:
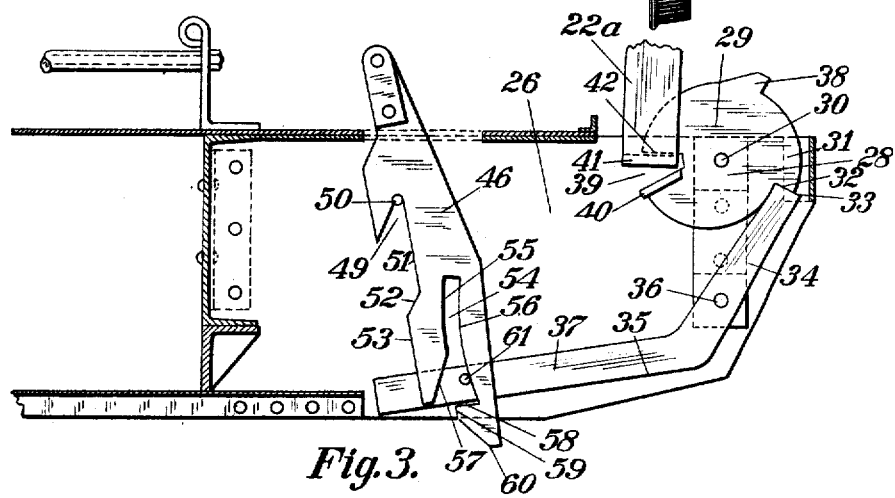
Figure 4:
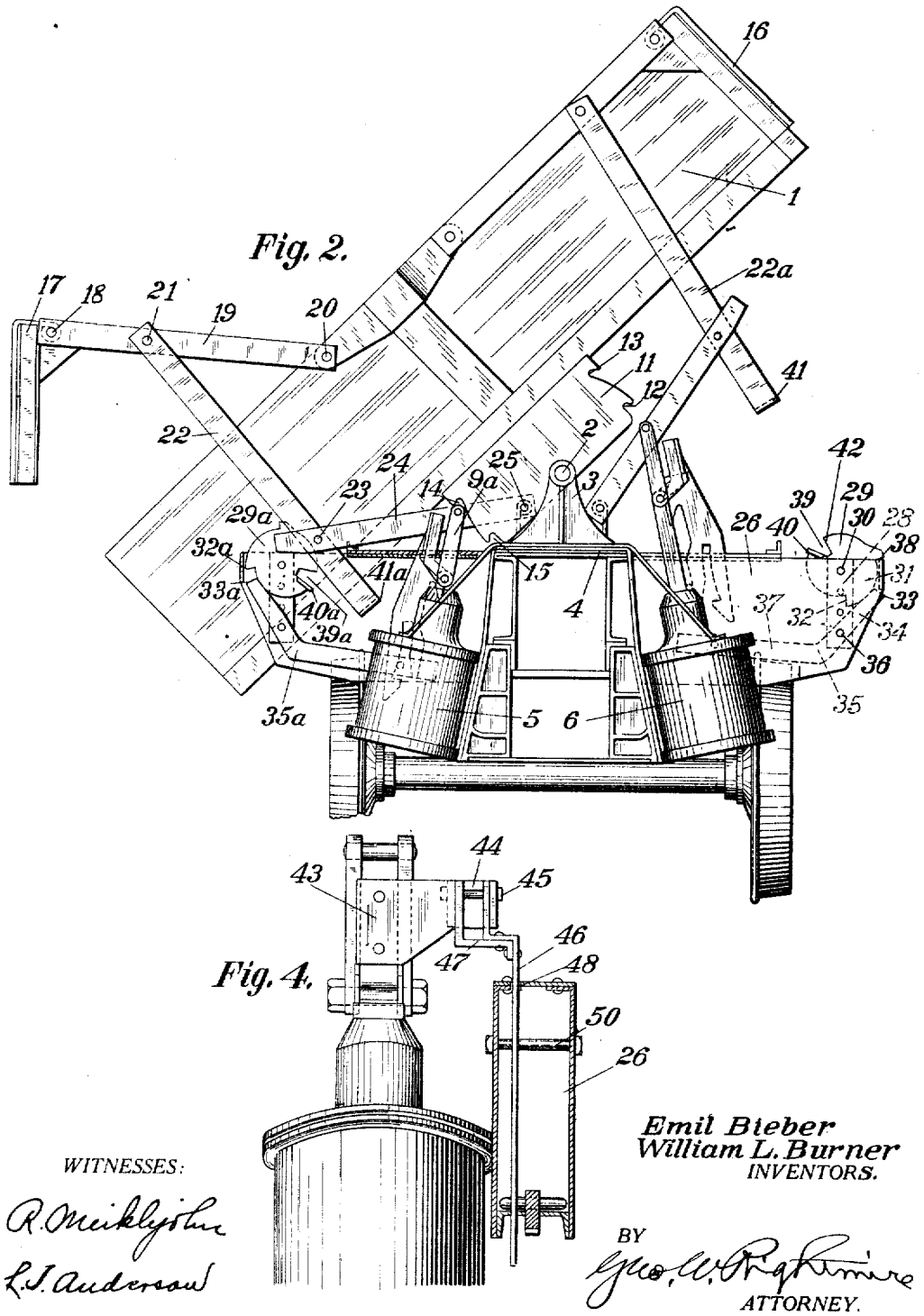
Figure 5:
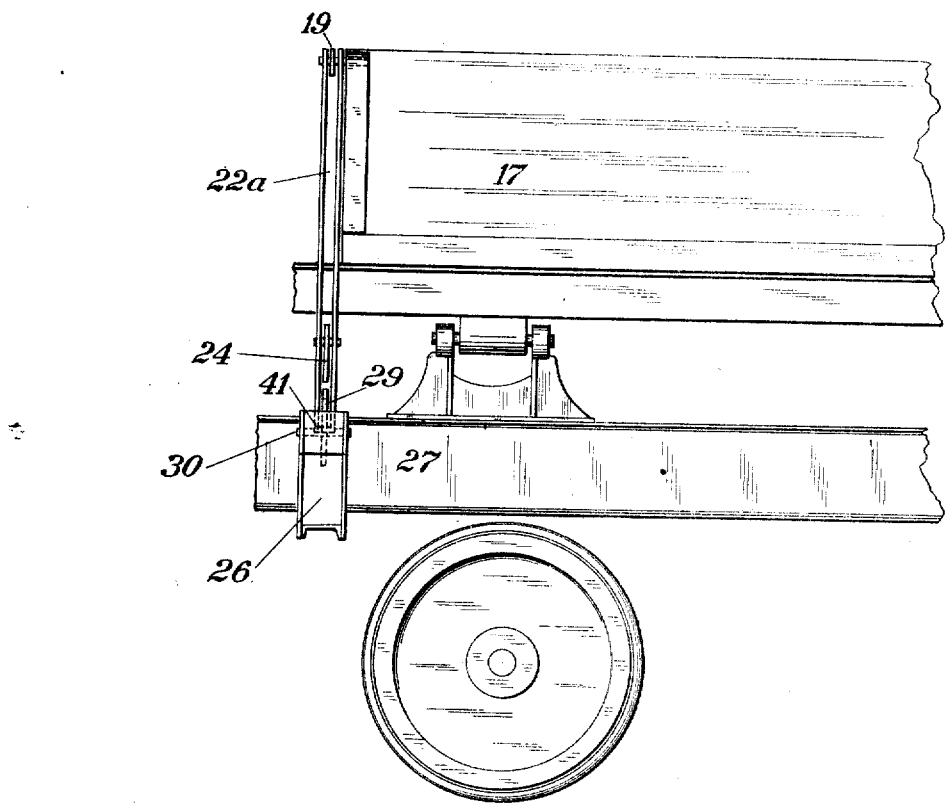

In the drawings which are hereto attached and which are hereby made a part of this specification, Figure 1 is an end view of the car having our improved locking devices mounted thereon; Fig. 2 is an end of the car showing the position of the parts when said car is in its dumped position; Fig. 3 is a side view of the lock and the means connecting the same with the piston: Fig. 4 is a side view of a cylinder showing the attachment of the lock-manipulating means to the piston; Fig. 5 is a view of the link member constructed to engage the lock.

In the drawings, 1 is the car body pivotally mounted at 2 upon a pivot shaft, or if preferred, a series of longitudinal pivots arranged beneath the car body, 3 is the bracket arising from the underframe construction 4 upon which the car body is pivoted, 5 and 6 are cylinders containing pistons, one shown at 7, and bearing the piston rod 8 having at its upper end the link construction 9, the piston rod being bent laterally as shown at 10, adjacent its outer end. When the piston is actuated, the link construction 9 will contact with the plate 11 mounted centrally of the lower portion of the end of the car body, engaging with the notches 12, 13, 14 and 15, depending upon which piston is actuated, and upon whether the car is to be dumped or righted.

As shown in Fig. 2, the dumping of the car is effected through the cylinder on one side of the underframe construction, and is righted through the cylinder on the opposite side. The doors 16 and 17 of the car extend longitudinally thereof at each side, and are supported pivotally as shown at 18 upon the outer end of an arm 19 pivoted at 20; pivotally connected at 21 with the arm 19 is the link 22, which at its lower end is pivotally connected at 23 with the lateral arm 24, the latter being pivotally mounted upon the underframe construction at 25. It is apparent that the construction on the opposite side of the car is identical. When the car is dumped, as shown in Fig. 2, the arrangement of pivoted arms and connecting link, will effect the raising of the door 17, and when the car is righted the arm and link construction will cause the door to drop gradually into its proper position at the side of the car. Meanwhile, on the opposite side of the car the link and arm construction will adapt itself to the elevation of that side of the car, and will be lifted or depressed according as the car body on that side is elevated or returned to normal position.

Adjacent the end of the car, and preferably mounted rearwardly of the truck is the box like construction indicated at 26 which is mounted upon and supported from the center sill of the car 27. This box-like construction is adapted to contain the locking means and the means for manipulating the same, which will now be described.

At each side of the box like construction and mounted therein upon the bracket 28 is a rotary lock 29 journaled at 30 to rotate freely, said lock containing the eccentric portion 31 for the purpose of giving the lock a tendency to rotate to bring said portion 31 into the lower position, whereby the lock tends constantly to be positioned properly for engagement with the link 22ª; the shoulder 32 on said lock is adapted to be positioned against the end 33 on the outer arm 34 of the bent lever 35, when the parts are in their normal position. Said lever 35 is pivoted at 36 beyond its middle point, so that the arm 37 thereof being heavier will constantly tend to maintain the arm 34 in engagement with the eccentric portion 31 of the lock 29, when the parts are in their unlocked position; the lock 29 is also provided with the second shoulder 38, which, when the shoulder 32 is freed from engagement with the arm 34 will, when the lock is rotated, engage with the end 33, and prevent the further rotation of the lock in that direction. Shoulder 38 is therefore provided as a precaution rather than as a necessity, although in case of violent operation of the car the said shoulder would be called into use as stated.

The lock 29 is notched as shown at 39, the lower face of the notch being provided with the flange 40. As shown in Fig. 5. the link 22ª is formed preferably of parallel members, said members being united at their lower end by the cross piece 41, so that when the car body occupies its normal position, a portion of the lock 29 is positioned between the parallel members of the link 22ª and the cross piece 41 is adapted to be in engagement with the upper face 42 of the notch 39. As the link 22 is lowered on the side of the car towards which it is being dumped, it will ride over the flange 40ª on the rotary lock 29ª, the flange being wide enough to prevent its entering the space between the parallel members of the link; consequently when the car is righted and the link 22 resumes its normal position, it will slide upon the outer face of the flange 40ª until the cross piece 41ª is brought into proper position for entering the notch 39ª. If the flange 40ª were not provided, the cross piece 41ª on the link 22 might engage the lock at a point below the notch, and be caught thereon, thereby preventing the car body from assuming its normal position.

On account of the mounting of the bent lever 37 adjacent its outer end, the arm 34 thereon will normally be maintained in engagement with the circumference of the lock 29, and when the car body is being righted, immediately upon passing the shoulder 32 said arm 34 will engage therewith and prevent the further downward movement of said shoulder until the lever 37 is again lifted out of its engagement with said lock. The means for effecting this movement of the lever will now be described.

As pointed out above, the piston rod 8 at a point outside of and adjacent one end of the cylinder is bent laterally, indicated at 10, and upon the bent portion 10 is mounted a plate 43 which extends laterally and has thereon the recessed portion 44 through the walls of which is passed the pivot bolt 45; mounted upon the pivot bolt 45 to oscillate thereon laterally of the car is the latch 46, containing the reinforcing member 47, said latch depending from said pivot 45 and extending into the box-like construction 26, being admitted thereinto through the opening 48 at the top and extending out through the lower portion thereof, as appears in Fig. 4. Said latch 46 contains the notch 49 adapted to receive the pin 50 to be guided thereby; the latch is also provided with the face portion 51, the cam portion 52 and the lower face portion 53, all of which portions may ride upon the pin 50 as the latch is being raised. The latch also is provided with the long slot 54 having the curved faces 55 and 56, the cam face 57, the hook portion 58, the latter having the face portion 59, and the cam surface 60. The lever arm 37 carries the stud 61 which is adapted to be received into the long slotted portion 54, the faces of said portion and the hook and its faces, mentioned above, being adapted to ride upon said stud 61 as the latch 46 is being raised or lowered.

Inasmuch as the latch 46 is mounted upon the plate 43 which is rigidly mounted upon the upper end of the piston rod, the latch will be elevated or lowered with the elevation or lowering of said piston rod; therefore, the application of air to the piston will lift said latch, and when the air is cut off, the piston being retracted by the spring 62, the latch will be lowered therewith. In Fig. 3 are shown the latch and the lever and the rotary lock and the depending link 22ª as they appear when the car body is in its normal position. If the air be applied and the piston be raised, the latch 46 will be lifted, and inasmuch as the latch occupies an inclined position, the face 51 will remain in contact with the pin 50; when the hook 58 engages with the stud 61, the arm 37 of the lever 35 will be lifted, thereby disengaging the end 33 of the short arm 34 from the shoulder 32 on the rotary lock. As the piston continues to rise, the link construction 9 at the outer end of the piston rod, will engage with the notch 12 on the car body and will cause the same to be tilted, thereby, through the link 22ª, rotating the lock 29, it being understood that the lock is now free to rotate, inasmuch as the latch 46 has lifted the arm 34 out of engagement with the shoulder 32. As the upward movement of the piston continues, cam face 52 of latch 46 is brought into engagement with the pin 50, thereby giving the latch a lateral movement and causing the hook 58 to be disengaged from the stud 61, and the face 53 engaging with the pin 50, will maintain the latch out of engagement with the stud 61; the lever 35 is now free to drop to its normal position, thereby bringing the inner face of the arm 34 into engagement with the curved portion of the lock 29 as shown in Fig. 2. The relative position of the various parts mentioned in connection with the lock are clearly shown in Fig. 2, so far as concerns the elevated side of the car body; likewise the position of the parts connected with the lock on the depressed side is also shown in Fig. 2, reference to which shows that the latch and the locking lever occupy their normal position, while the lock has been given a rotary movement downward by the engagement of the link 22 with the flange 40ᵃ of the notch in said lock.

When the car has been dumped, the air is cut off from the operating piston and the latter is retracted by the spring 62, carrying with it the latch which is returned to its normal position. Now if the car be righted, the link 22ᵃ in its descent will engage the flange portion 40 upon the lock, causing the latter to be rotated until the car body has reached its normal position, whereupon it will be found that the lock has been rotated to the position shown in Fig. 1, the cross piece 41 on the link 22 being in engagement with the face 42 on the notch 39 in the lock, and the outer end 33 of the lever 35 being in engagement with the shoulder 32 on the said lock. On the opposite side of the car the return of the door 17 to its normal position will cause the lower end of the link 22 to be swung towards the lock, and the outer face of said link will engage with and move upon the flange 40ᵃ of the lock until the cross piece 41ᵃ at the lower end of the link 22 engages with the notch in said lock and rotates the same upwardly until the shoulder 32ᵃ thereon engages with the outer end 33ᵃ of the locking lever 35ᵃ. This latter movement will take place simultaneously with the return of the lock on the opposite side of the car to its normal position, so that both sides of the car will be locked at the same moment against a dumping movement thereof.

It will be noted that when the car body is being righted, the latch on that side of the car will move upwardly with the piston rod, and will carry with it the lever 35ᵃ; after moving upwardly the predetermined distance, the cam face of the latch will come in contact with the pin and will cause the latch to be thrust laterally whereby the same is disengaged from the lever 35ᵃ, the latter then dropping to its normal position; so that as the righting movement continues, when link 22 engages the notch in the disk 29ᵃ, and exercises a pull thereon, the end 33ᵃ of the lever 35ᵃ, will engage against the shoulder 32ᵃ and prevent further upward movement of the link 22, thereby locking the car body on that side. In the description above given, it is stated that when the car is being dumped, the lever 35 will be lifted out of engagement with the disk 29 by means of the latch 46, and that the latter will be given a side thrust at a predetermined point, thereby releasing the same from said lever. It is clear that it is not necessary to release the lever on the dumping side of the car for the reason that the return of the latch to normal position takes place before the righting of the car has been commenced, and therefore said lever would be in proper position to lock said disk 29 whenever such locking becomes necessary. The releasing of the lever from the latch becomes important only in case of the lever located on the side of the car upon which the righting force is exerted; and inasmuch as the mechanism on one side of the car may be used for dumping on one occasion and for righting on another occasion, the latch should be so constructed that it will be released at the same time, no matter whether the piston to which the latch is connected is at that instant righting or dumping said car. Accordingly I have shown the latch of the same construction on both sides of the car and adapted to operate in the same manner.

It is apparent that to right the car, the link construction 9ᵃ will engage with the notch 14 on the plate 11, whereas in dumping the car the link construction will engage with the lower notch on said plate.

Our improved locking construction is automatic in its operation, and requires no attention to keep the same in order; with the methods of locking in common use, the unlocking of the car bodies to dump the same, and the locking again when the same are righted, would require a great deal of time and labor.

Our construction is much more economical, is highly efficient and dispenses with all the labor necessary to lock and unlock dumping cars as the same are found in common use; the engineer of a train of loaded cars, seated in his cab, applies the air to the cylinders by one movement of a lever, selecting the side of the car to which the power is to be applied, and the operation of the piston to dump the car also causes the unlocking thereof, whereupon the same is immediately free to be dumped. As soon as the cars are dumped the air is cut off and the pistons are retracted to their normal position, thereby returning the members for manipulating the locking lever to their normal positions. Now to right the car, the engineer operates another lever which will admit air into the cylinders on the opposite sides of the cars, whereupon the pistons will travel upwardly and cause the car body to resume its normal position, the locking devices being returned to their normal locking positions by the links depending from the car body. Therefore, every operation of the car is controlled by the engineer in his cab at the end of the train, and no personal attention to the manipulation of the locking devices is required.

We do not mean to restrict ourselves to a construction which is operated by an engineer in his cab, as noted, but contemplate improvements which may be manipulated by an operator at any particular car, so that one car may be dumped to the exclusion of all others.

Having described our invention, what we claim as new and desire to secure by Letters Patent is:

1. A dump car comprising a car body pivotally mounted to be dumped laterally, a link structure mounted upon said car body, a locking disk with which said link structure is adapted to engage and hold said car body in normal position, means for maintaining said disk against movement tending to release said link structure, and means for releasing said disk to permit said car body to be dumped.

2. A dump car comprising a car body pivotally mounted to be dumped laterally, an arm mounted upon said car body, a disk adapted to engage said arm to prevent the dumping of said car body, and means adapted through gravity to maintain said disk in locking engagement with said arm, and means adapted to actuate said means to release said disk to permit the dumping of said car body.

3. A dump car comprising a car body pivotally mounted to adapt the same to be dumped, fluid operated means adapted to cause said car body to dump, fluid operated means adapted to right said car, locking means mounted upon said car to maintain the said car body against a dumping movement, and connections between said dumping means and said locking means whereby the latter is released upon the operation of the former, and connections between said locking means and said righting means whereby the former is restored to locking position by the actuation of the latter.

4. A dump car comprising a car body pivotally mounted to adapt the same to be dumped, dumping means provided at one side of said car, righting means provided on the opposite side of said car, similar locking means provided upon opposite sides of said car, locking means on both sides being adapted to be released by the dumping of the car and adapted to be restored to locking position by the righting of the car.

5. A dump car comprising a car body pivotally mounted to adapt the same to be dumped, a member depending from said car body, a disk rotatably mounted on said car having a notch therein, said member being adapted to engage said notch to lock said car body against being dumped, means for maintaining said disk in its said engaging position, and means for releasing said disk to permit the dumping of said car body.

6. A dump car comprising a car body pivotally mounted to adapt the same to be dumped, a member depending from said car body, a disk having a notch therein mounted upon said car and adapted to engage said member, means for maintaining said notch in engagement with said member, and means for dumping said car body, said latter means being adapted upon its actuation to free said member from engagement with said disk.

7. In a dump car, locking means comprising a disk pivotally mounted and having a depression therein, a shoulder formed upon said disk, a lever adapted at one end to engage said shoulder to maintain said disk in locking position, and means adapted to manipulate the other end of said lever to release the same from its engagement with said disk to permit said car to be dumped.

8. In a dump car, locking means to maintain said car in normal position, comprising a rotatable member, a depression therein, a shoulder thereon, a lever pivotally mounted to engage said shoulder with one of its ends, and fluid operated means engaging the other end of said lever to withdraw the same from engagement with said disk.

9. In a dump car locking means comprising a rotatably mounted member, a notch therein, a shoulder thereon, a lever adapted to engage said shoulder with one of its ends, fluid operated means having connection with said lever whereby the actuation of said means causes said lever to release said rotatably mounted member to permit said car to be dumped.

10. In a dump car, locking means comprising a rotatably mounted member, means thereon for engaging with the car body, a shoulder thereon, a pivotally mounted lever adapted to engage said shoulder with one of its ends, fluid operated dumping means, a connection between said dumping means and said lever for rendering said rotatable member free to move when said dumping means is actuated to dump said car.

11. In a dump car a pivotally mounted car body, a link member depending therefrom, a rotatable lock member adapted to engage said link member, a shoulder on said lock member, a lever adapted with one end thereof to engage said shoulder to maintain said lock member in engagement with said link member, fluid operated means for dumping said car, a latch member connecting said fluid operated means with said lever, whereby the latter is lifted out of engagement with said lock member when said car is dumped.

12. In a dump car comprising a pivotally mounted car body, fluid operated means for dumping the same, a link member depending from said car body, a lock member constructed to engage with said link member to hold said car body against dumping, means for maintaining the engagement of said lock member with said link member, a latch mounted upon said fluid operated means and adapted when said latter means is actuated to dump said car to cause said lock member to be set free from its locking position.

13. In a dump car comprising a car body, fluid operated means for dumping the same, a link member depending from said car body, a lock member mounted upon said car and adapted to engage said link member, a lever adapted to engage said lock member to maintain the same in its locking position, a latch mounted upon said fluid operated means and adapted to be brought into engagement with said lever to release said lock member when said fluid operated means is actuated to dump said car.

14. In a dump car comprising a car body and means for dumping the same, a link member depending from said car body, a lock member mounted upon said car and adapted to engage said link member, a lever adapted to engage said lock member to maintain the same in its locking position, a latch mounted upon said dumping means and adapted to be brought into engagement with said lever to move the same out of engagement with said lock member, means for disengaging said latch from said lever, whereby said lever is returned to engagement with said lock member.

15. In a dump car comprising a car body, a link member thereon, a lock member adapted to engage said link member, a lever adapted to engage said lock member to maintain the latter in engagement with said link member, a fluid actuated piston rod, a latch member mounted upon said rod and adapted to engage said lever to move the latter out of engagement with said lock member, means for deflecting said latch out of engagement with said lever during the movement of said latch and means for returning said latch to a position for reëngaging said lever.

16. In a dump car, locking means comprising a rotatably mounted lock member, an arm depending from the car body adapted to engage said lock member, a lever adapted to engage said lock member to maintain the same in engagement with said arm, fluid operated dumping means, a latch connecting said dumping means with said lever and adapted when said dumping means is operated to release said lever from said lock member, said latch having a cam face, and a pin with which said cam face engages as said latch is lifted, whereby said latch is disengaged from said lever.

17. In a dump car, locking means comprising a rotatably mounted lock member, an arm depending from the car body adapted to engage said lock member, a lever adapted to engage said lock member to maintain the same in engagement with said arm, fluid operated dumping means, a latch connecting said dumping means with said lever and adapted when said dumping means is operated to release said lever from said lock member, said latch having a cam face, a pin with which said cam face engages as said latch is lifted, whereby said latch is disengaged from said lever, and means for retracting said latch and properly positioning the same for reëngaging said lever.

18. In a dump car, locking means comprising a rotatably mounted member, a notch therein, a shoulder thereon, a lever adapted to engage said shoulder with one of its ends, means for moving said lever out of engagement with said shoulder, means for releasing said lever at a predetermined moment whereupon said lever is returned to contact with said rotatable member, and maintains said contact and upon the proper movement of the latter resumes its engagement with said shoulder, whereby said rotatable member is locked.

19. In a dump car, a car box pivotally mounted, means for dumping the same towards either side, and means for locking said car box in its normal position adapted to be actuated by said dumping means to unlock the same when the car box is dumped.

20. In a car, a car box pivotally mounted, means for dumping the same, a door controlling member depending from said car box, and automatic locking and releasing means for said member.

21. In a dump car, a car box pivotally mounted, dumping means for the same, a member depending from said car box, means on one side of the said car adapted to engage said member to lock the same against upward movement, said locking means being adapted to be unlocked by the dumping of said car box, said locking means on the other side of said car meanwhile retaining its normal position.

22. In a dump car, a car box pivotally mounted, means for dumping the same, a member depending from said car box, means under the control of said dumping means for locking said member against upward movement but leaving the same free to move downwardly.

23. In a car, a car box pivotally mounted, means carried by said car for dumping the same, a member depending from said car box, means under control of said dumping means for engaging said depending member whereby the same is prevented from moving upwardly but is left free to move downwardly.

24. In a dump car, a car box pivotally mounted, fluid operated means for dumping the same, a member depending from said car box, locking means adapted to engage said member to hold the same against upward movement but leaving said member free to move downwardly, a connection between said dumping means and said locking means whereby when said dumping means is operated said locking means is unlocked, and when said dumping means returns to its dumping position said locking means is again positioned for locking said member.

25. In a dump car, a car box, similar means disposed on each side of the pivot of said car box, the means on one side being adapted to dump the same, and the means on the opposite side being adapted to right the same, members depending from said car box on opposite sides of the pivot thereof, means disposed on opposite sides of the pivot of said car box adapted to engage said members to lock the same, and connections between said locking means and said first mentioned means to release said locking means from engagement with said member on the side of the car which is to be elevated in dumping the same, whereby the member thus released is free to move upwardly and said car box may be dumped.

26. In a dump car, a car box pivotally mounted, similar means disposed on opposite sides of said pivot, the means on one side being adapted to dump said car box and the means on the opposite side being adapted to right the same, similar members depending from said car box on opposite sides of the pivot thereof, locking means for said members to maintain the same against upward movement thereof, and connections between said first mentioned means and said locking means for releasing said locking means from engagement with a selected depending member to permit said car box to be dumped, the locking means on the opposite side of said car meanwhile retaining its normal position to act as a stop for the depending member on that side when said car box is righted.

27. In a dump car a car box pivotally mounted, a member depending from said car box upon each side of the pivot thereof, locking means for engaging each of said members when the car box is in its normal horizontal position to prevent tilting thereof, means disposed on each side of said car box adapted to dump or to right the same at will, the means not utilized for dumping the same being employed for righting the same, and connections between said dumping means and said locking means whereby when said car is dumped the locking means on the side from which the dumping impetus came is released from said depending member to permit the same to move upwardly while the locking means on the opposite side of said car are retained in normal position, the depending member on the opposite side of said car being meanwhile free to move downwardly, but when said car is righted said last mentioned depending member is again brought into engagement with said locking means.

28. In a dump car, a pivotally mounted car box, a door-controlling member depending therefrom, automatic means for locking said member to prevent the dumping of said car box, and means for unlocking said member to permit said car box to be dumped.

29. In a dump car, a pivotally mounted car box, means disposed on each side thereof for locking the same against a dumping movement, means for unlocking the locking means on one side of said car box to permit said car box to be dumped, the locking means on the opposite side of car box remaining in normal position during the dumping and righting movements of said car box.

In testimony whereof we affix our signatures in the presence of two witnesses.

EMIL BIEBER.
WILLIAM L. BURNER.

Witnesses:
HORACE S. KERR,
GEO. W. RIGHTMIRE.